(12) United States Patent
Joo et al.

(10) Patent No.: US 11,263,959 B2
(45) Date of Patent: Mar. 1, 2022

(54) DISPLAY APPARATUS FOR CONTROLLING OUTPUT VOLTAGE OF A DISPLAY DEVICE TO NORMALLY DISPLAY IMAGE

(71) Applicant: SAMSUNG ELECTRONICS CO., LTD., Suwon-si (KR)

(72) Inventors: Sungyong Joo, Suwon-si (KR); Wonmyung Woo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/957,153

(22) PCT Filed: Feb. 28, 2019

(86) PCT No.: PCT/KR2019/002439
§ 371 (c)(1),
(2) Date: Jun. 23, 2020

(87) PCT Pub. No.: WO2019/172580
PCT Pub. Date: Sep. 12, 2019

(65) Prior Publication Data
US 2020/0380912 A1    Dec. 3, 2020

(30) Foreign Application Priority Data
Mar. 5, 2018 (KR) .................. 10-2018-0025788

(51) Int. Cl.
*G09G 3/32* (2016.01)
(52) U.S. Cl.
CPC ....... *G09G 3/32* (2013.01); *G09G 2310/0289* (2013.01); *G09G 2320/0204* (2013.01)

(58) Field of Classification Search
CPC .. H02M 1/4208; H02M 3/33569; H02M 1/42; Y02B 70/10
See application file for complete search history.

(56) References Cited

U.S. PATENT DOCUMENTS 6,222,746 B1 * 4/2001 Kim ................... H02M 1/4225
363/89
6,232,964 B1 * 5/2001 Lee ................... H02M 1/4225
345/212

(Continued)

FOREIGN PATENT DOCUMENTS

CN      103532392 B  * 10/2016 .......... H02M 1/4225
KR      10-0462787 B1    12/2004
(Continued)

OTHER PUBLICATIONS

Written Opinion dated Jun. 19, 2019 issued by the International Searching Authority in counterpart International Application No. PCT/KR2019/002439 (PCT/ISA/237).
(Continued)

*Primary Examiner* — Chad M Dicke
(74) *Attorney, Agent, or Firm* — Sughrue Mion, PLLC

(57) ABSTRACT

Disclosed is a display device including a power factor corrector including a converter correcting a power factor of an input power and a controller controlling the converter, a power transformer converting power, of which a power factor is corrected by the power factor corrector, and a display panel receiving power through the power transformer to display an image. The controller controls the converter to increase a first voltage when the first voltage output through the converter is less than a specified voltage. Other various embodiments as understood from the specification are also possible.

8 Claims, 6 Drawing Sheets

(56) References Cited

U.S. PATENT DOCUMENTS

| | | | |
|---|---|---|---|
| 8,421,929 B2 | 4/2013 | Joo et al. | |
| 8,957,547 B2 | 2/2015 | Chang et al. | |
| 9,088,223 B2 | 7/2015 | Park et al. | |
| 9,295,117 B2 | 3/2016 | Acatrinei | |
| 9,444,280 B2 | 9/2016 | Lee | |
| 9,481,255 B2 | 11/2016 | Yim et al. | |
| 9,509,158 B2 | 11/2016 | Lee | |
| 9,668,308 B2 | 5/2017 | Hsia | |
| 9,690,311 B2 | 6/2017 | Shih et al. | |
| 9,735,669 B2 | 8/2017 | Gao | |
| 9,780,638 B2 | 10/2017 | Simi | |
| 10,284,132 B2 | 5/2019 | Marcinkiewicz et al. | |
| 2002/0057080 A1* | 5/2002 | Telefus | H02M 3/156 323/283 |
| 2004/0145584 A1* | 7/2004 | Lee | H05B 41/2822 345/212 |
| 2005/0213353 A1* | 9/2005 | Lys | H02M 3/155 363/17 |
| 2008/0049464 A1* | 2/2008 | Chen | H02M 1/4208 363/44 |
| 2008/0218503 A1* | 9/2008 | Lee | H02M 3/33561 345/211 |
| 2009/0201707 A1* | 8/2009 | Park | H02M 3/33561 363/126 |
| 2011/0096242 A1* | 4/2011 | Joo | G05F 1/70 348/730 |
| 2011/0128303 A1* | 6/2011 | Yonemaru | H05B 45/37 345/690 |
| 2015/0179098 A1* | 6/2015 | Kuang | H05B 33/00 345/211 |
| 2015/0378416 A1 | 12/2015 | Wang | |
| 2016/0181942 A1* | 6/2016 | Sugawara | H02M 1/4225 363/126 |
| 2017/0302159 A1 | 10/2017 | Green et al. | |
| 2017/0302160 A1 | 10/2017 | Marcinkiewicz et al. | |
| 2017/0302161 A1 | 10/2017 | Green | |
| 2017/0302200 A1 | 10/2017 | Marcinkiewicz | |
| 2017/0302214 A1 | 10/2017 | Marcinkiewicz et al. | |
| 2017/0317578 A1 | 11/2017 | Gao | |
| 2017/0366090 A1* | 12/2017 | Sugawara | H02M 3/156 |
| 2019/0288630 A1 | 9/2019 | Marcinkiewicz et al. | |

FOREIGN PATENT DOCUMENTS

| | | |
|---|---|---|
| KR | 10-0581880 B1 | 5/2006 |
| KR | 10-2011-0045869 A | 5/2011 |
| KR | 10-2014-0021892 A | 2/2014 |
| KR | 10-1422024 B1 | 7/2014 |
| KR | 10-101670994 B1 | 11/2016 |

OTHER PUBLICATIONS

International Search Report dated Jun. 19, 2019 issued by the International Searching Authority in counterpart International Application No. PCT/KR2019/002439 (PCT/ISA/210).

\* cited by examiner

DISPLAY APPARATUS FOR CONTROLLING OUTPUT VOLTAGE OF A DISPLAY DEVICE TO NORMALLY DISPLAY IMAGE

This application is a National Stage of International Application No. PCT/KR2019/002439, filed Feb. 28, 2019, claiming priority based on Korean Patent Application No. 10-2018-0025788, filed Mar. 5, 2018, the contents of all of which are incorporated herein by reference in their entirety.

TECHNICAL FIELD

Embodiments disclosed in this specification relate to a technology of controlling, an output voltage of a display device.

BACKGROUND ART

A display device refers to a device displaying the image received from the outside or the image stored in an internal storage device. The display panel included in the display device may include a light emitting device such as an light emitting diode (LED), an organic light emitting diode (OLED), or the like for displaying an image by emitting light.

The power supply device may supply the power necessary to operate the display device. The power supply device may convert the power received from external power source to supply the converted power to a display. The power supply device may convert alternating current (AC) power received from external power source to direct current (DC) power to supply the converted DC power to the display.

The power supply device may, improve the power factor of the power supplied to the display device. The power supply device may improve the power factor of the received power to increase the efficiency of the power received by the display device.

DISCLOSURE

Technical Problem

A capacitor for supplying the voltage of the specified magnitude to a display panel of a display device may refer to a capacitor having a small capacity due to the size of a part and safety reasons. When the display panel operates as a high load, a voltage is output from a power supply unit to be less than or equal to a specified magnitude, and thus the display panel 120 may tail to display an image normally.

The display device according, to various embodiments of the disclosure may perform a high-speed response under voltage protection MVP) function for normally outputting an image.

Technical Solution

According to various embodiments disclosed in this specification, a display device may include a power factor corrector including a converter correcting a power factor of an input power and a controller controlling the converter, a power transformer converting power, of which a power factor is corrected by the power factor corrector, and a display panel receiving power through the power transformer to display an image. The controller may control the converter to increase a first voltage when the first voltage output through the converter is less than a specified voltage.

Furthermore, according to various embodiments disclosed in this specification, the controller may generate a first signal for controlling the convener, based on the first voltage.

Moreover, according to various embodiments disclosed in this specification, the first signal may be a signal for generating a second voltage during a specified period at a specified duty ratio, and the controller may increase a duty ratio of the second signal when the first voltage is less than a specified voltage.

Also, according to various embodiments disclosed in this specification, the controller may include an oscillator generating a second signal and a signal controller changing the second signal based on the first voltage. The controller may generate the first signal for controlling the converter based on the changed second signal and the first voltage.

In addition, according to various embodiments disclosed in this specification, the signal controller may change the second signal when the first voltage is less than a specified voltage.

Besides, according to various embodiments disclosed in this specification, the second signal may be a signal in which a triangular wave increasing to a second voltage at a specified slope during a specified time is periodically generated, and the signal controller may change at least one of the specified time and the specified slope of the second signal.

Furthermore, according to various embodiments disclosed in this specification, the signal controller may reduce the specified slope to change the specified time for increasing to the second voltage.

Moreover, according to various embodiments disclosed in this specification, the signal controller may include an amplifier configured to provide an input to the oscillator.

Also, according to various embodiments disclosed in this specification, the controller further may further include a compensation circuit configured to compensate for an input voltage based on the first voltage, and the compensation circuit may be composed of passive elements.

In addition, according to various embodiments disclosed in this specification, a capacitor of a specified capacity or less may be installed in an output terminal of the converter.

Besides, according to various embodiments disclosed in this specification, the specified voltage may be a minimum value at which the display panel is capable of displaying an image without lost information.

Advantageous Effects

According to embodiments disclosed in this specification, when an output voltage output from a power supply unit is lowered rapidly because a display panel operates as a high load, a display device may detect a specified voltage to change a signal for controlling a power factor corrector, and thus may change the output voltage to the normal voltage at a fast response speed.

Besides, a variety of effects directly or indirectly understood through the disclosure may be provided.

DESCRIPTION OF DRAWINGS

With regard to description of drawings, the same or similar components may be marked by the same or similar reference numerals.

MODE FOR INVENTION

Hereinafter, various embodiments of the disclosure will be described with reference to accompanying drawings. However, those of ordinary skill in the art will recognize that modification, equivalent, and/or alternative on various embodiments described herein may be variously made without departing from the scope and spirit of the disclosure. With regard to description of drawings, similar components may be marked by similar reference marks/numerals.

Figure 1:
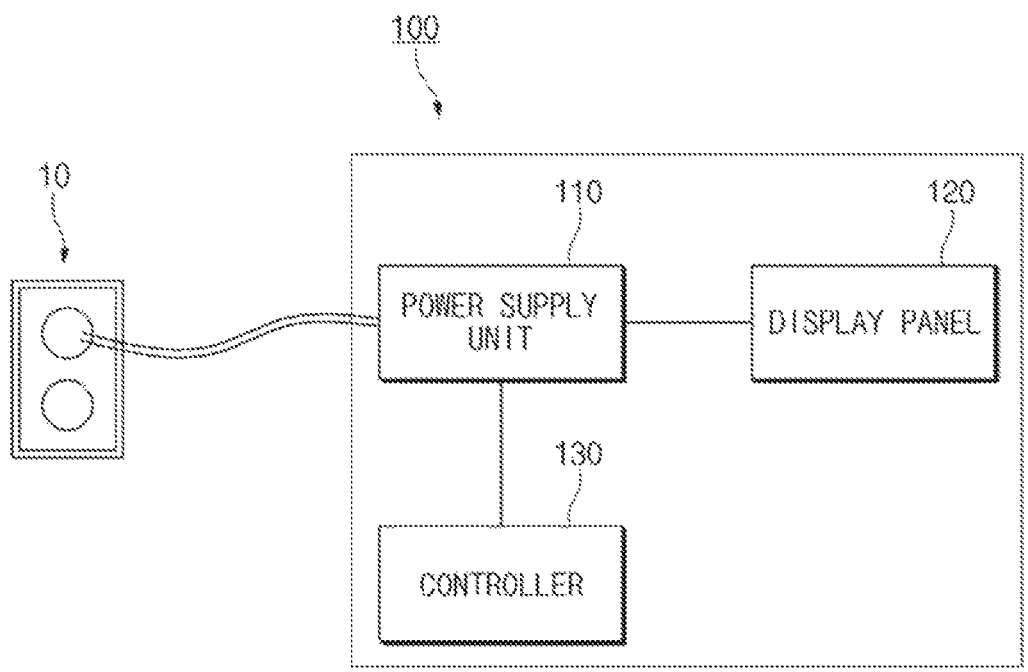
FIG. 1 is a view illustrating that a display device is connected to an external power source, according to various embodiments.

FIG. 1 is a view illustrating that a display device is connected to an external power source, according to various embodiments.

Referring to FIG. 1, a display device 100 may include a power supply unit 110, a display panel 120, and a controller 130.

According to an embodiment, the power supply unit 110 may receive power from an external power supply 10 and then may supply power necessary for each configuration of the display device 100 to operate. For example, the power supply unit 110 may supply driving power, which is necessary to operate, to the display panel 120 and the controller 130. According to an embodiment, the power supply unit 110 may rectify a current supplied from the external power supply 10. For example, the power supply unit 110 may convert the supplied AC power into DC power and may supply the converted DC power to each configuration. For example, the external power supply 10 may be wall mount power supply. The external power may supply the AC power of a specified magnitude.

According to an embodiment, the power supply unit 110 may correct the power factor of the supplied power. For example, the power supply unit 110 may correct the power factor through a converter for converting the supplied power. According to an embodiment, the power supply unit 110 may reduce the lost power by improving the power factor of the supplied power. For example, the power supply unit 110 may improve the power factor by correcting the power factor of the supplied power to be close to 1.

According to an embodiment, the display panel 120 may display an image (or a video image). For example, the display panel 120 may display an image depending on the received image information. For example, the image information may be stored in an internal memory or may be received from an external device. According to an embodiment, the display panel 120 may be composed of a plurality of pixels including light emitting elements. For example, the display panel 120 may be composed of a plurality of pixels including a backlight that transmits light to a liquid, crystal display (LCD) to display an image. For example, the backlight may include a light emitting diode (LED) backlight.

For another example, the display panel 120 may be composed of a plurality of pixels including an organic light emitting diode (OLED).

According to an embodiment, the voltage (or current) applied to the display panel 120 may be changed depending on image information. For example, when a bright image with various colors is displayed on the display panel 120, the voltage applied to the display panel 120 may be low. In other words, when a bright image is displayed, the display panel 120 may operate as a high load (or overload), and thus the voltage applied to the display panel 120 may be low. For another example, when an image with a simple color and a dark brightness is displayed on the display panel 120, the display panel 120 may operate as a low load, and thus the voltage applied to the display panel 120 may increase.

According to an embodiment, the controller 130 may control the overall operation of the display device 100. According to an embodiment, the controller 130 may control the power supply unit 110 and the display panel. 120 to output a specified image.

According to an embodiment, the controller 130 may control the power supply unit 110 to control the power supplied to the display panel 120. For example, the controller 130 may control a transformer to control the voltage supplied to the display panel 420. According to an embodiment, the controller 130 controls the display panel 120 to display an image on the display panel 120. For example, the controller 130 may display an image on the display panel 120 depending on image information.

The display device 100 may include a capacitor to supply a voltage of a specified magnitude to the display panel 120. The display device 100 may include a capacitor of a small-capacity for the size of a part and safety reasons. Accordingly, when the display panel 120 operates as a high load, a voltage is output from the power supply unit 110 to be less than or equal to a specified magnitude, and thus that the display device 100 may fail to display an image normally. The display device 100 according to various embodiments of the disclosure may perform a high-speed response UVP function for normally outputting an image.

Figure 2:
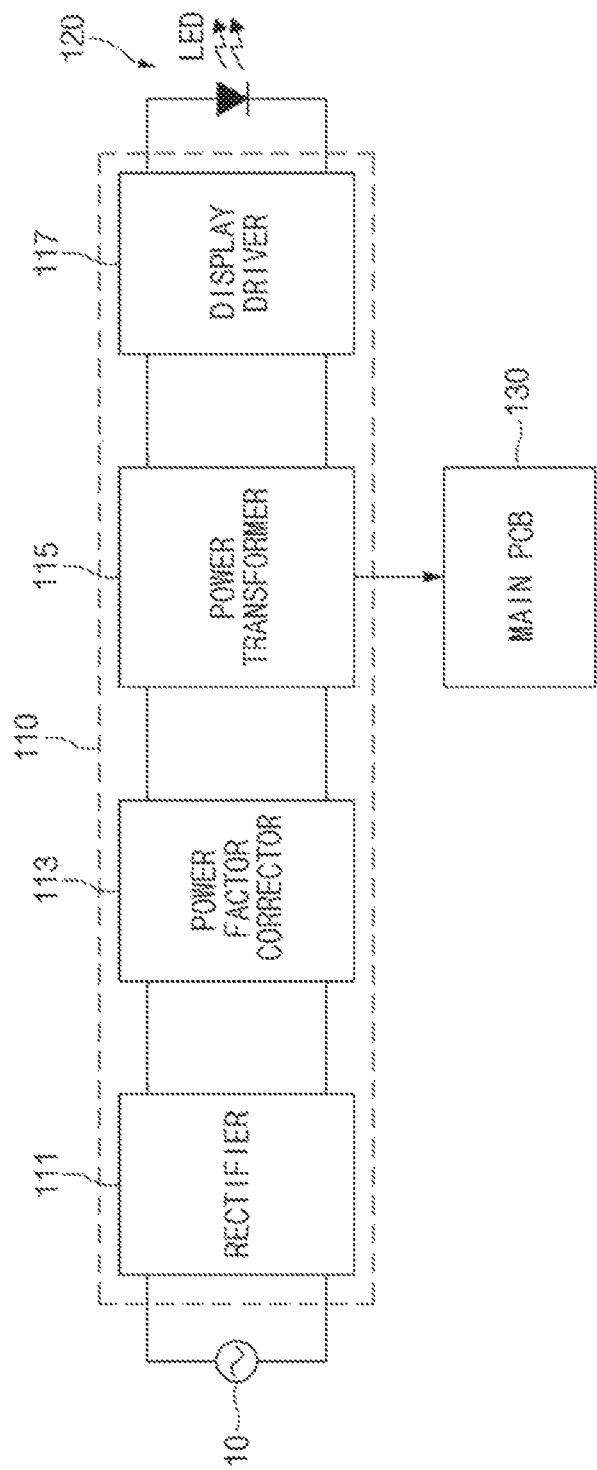
FIG. 2 is a block diagram showing a configuration of a power supply unit of a display device according to various embodiments.

FIG. 2 is a block diagram showing a configuration of a power supply unit of a display device according to various embodiments.

Referring to FIG. 2, the power supply unit 110 may include a rectifier 111, a power factor corrector 113, a power transformer 115, and a display driver 117.

According to an embodiment, the power supply unit 110 may receive power from the external power supply 10. For example, the power supply unit 110 may receive AC power from the external power supply 10.

According to an embodiment, the rectifier 111 may rectify the received power. For example, the rectifier 111 may convert the received AC power into DC power. In other words, the rectifier 111 may supply voltage or current one direction.

According to an embodiment, the power factor corrector 113 may correct the power factor of the DC power. For example, the power factor corrector 113 may control a converter to correct the power factor of the DC power. According to an embodiment, the power factor corrector 113 may correct the power factor of the DC power based on the voltage at a specified point of the power supply unit 110. For example, the power factor corrector 113 may correct the power factor of the DC power based on the output voltage of the power factor corrector 113. In other words, the power factor corrector 113 may correct the power factor of the DC power by feeding the output voltage back. For example, the output voltage may refer to the output voltage of a converter for correcting the power factor. According to an embodiment, the power factor corrector 113 may output a specified voltage. For example, the power factor corrector 113 may output a specified voltage through the power, of which the power factor is corrected.

According to an embodiment, when an output voltage is not greater than a specified voltage, the power factor corrector 113 may increase the output voltage. For example, when the output voltage of the converter is lowered to be less than or equal to the specified voltage, the power factor corrector 113 may control the converter to increase the output voltage. For example, the converter may include a capacitor of a low capacity in the output terminal for the size of a part and safety reasons. When the display panel 120 operates as a high load, the capacitor of a low capacity may rapidly drop the output voltage of the converter. According to an embodiment, the power factor corrector 113 may detect whether the output voltage is not greater than the specified voltage (under voltage detection (UVD)). When the detected voltage is not greater than the specified voltage, the power factor corrector 113 may respond quickly to prevent the output voltage of the convener from being less than or equal to the specified voltage (UVP).

According to an embodiment, the power transformer 115 may convert the input voltage to a specified gain. For example, the power transformer 115 may convert the voltage output from the power (actor corrector 113 to the specified gain. According to an embodiment, the power transformer 115 may apply the converted voltage to each configuration of the display device 100. For example, the power transformer 115 may apply the converted voltage to the display panel 120, and the controller 130 (e.g., a main printed circuit board (PCB)). The power transformer 115 may convert voltage by applying different gains depending, on each configuration of the display device 100.

According to an embodiment, the display driver 117 may supply the driving power necessary for the display panel 120 to display an image. For example, the display driver 117 may receive a signal (e.g., a dimming signal) for displaying an image and may supply the power corresponding to the received signal to the display panel 120. For example, the received signal may be received from the controller 130.

Accordingly, even though the power supply unit 110 includes a capacitor of a low capacity in the output terminal of a power factor corrector for the size of a part and safety, the power supply unit 110 may respond quickly depending on the voltage applied to the display panel 120 to output an image normally through the display panel 120.

Figure 3:
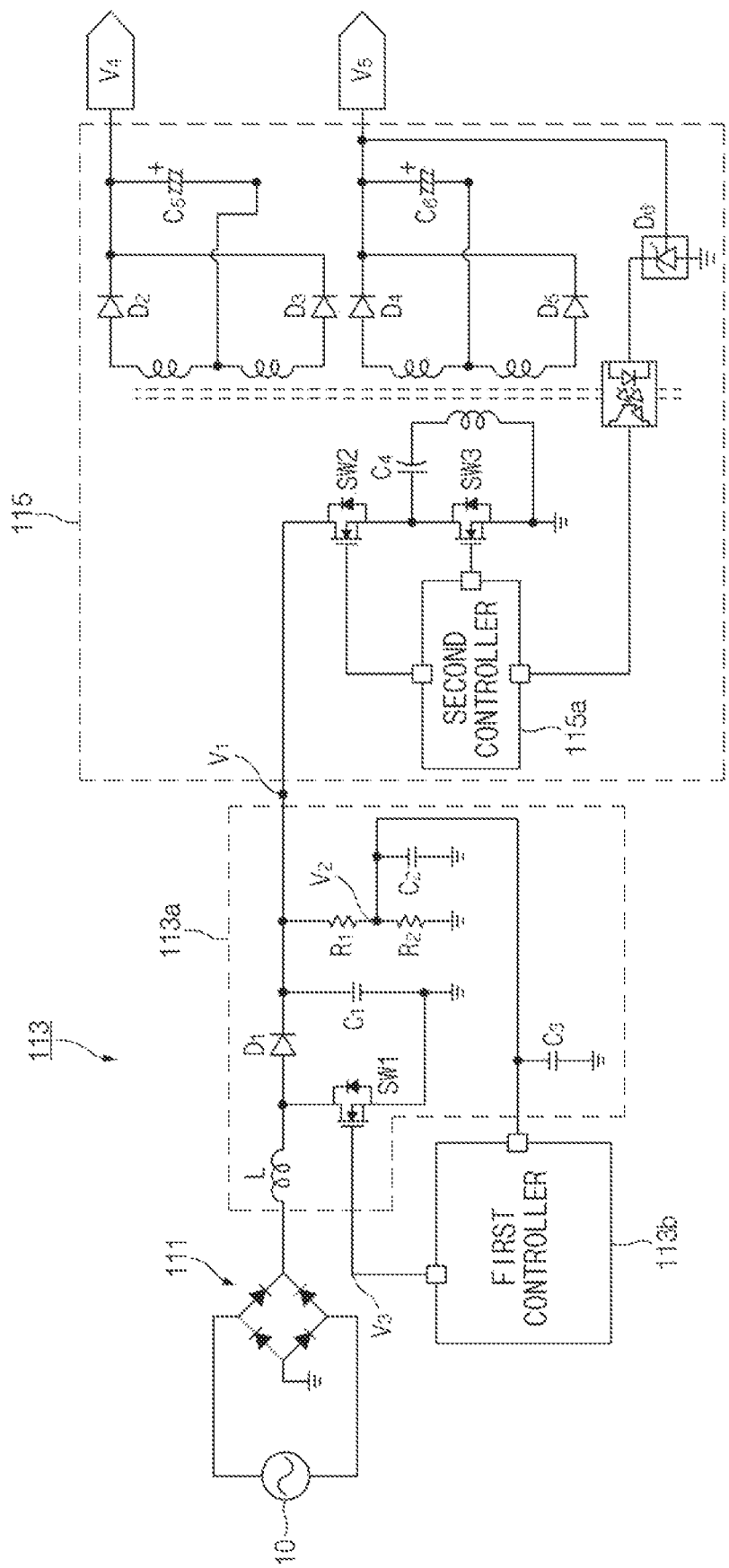
FIG. 3 is a circuit diagram of a power supply unit of a display device according to an embodiment.

FIG. 3 is a circuit diagram of a power supply unit of a display device according to an embodiment.

Referring to FIG. 3, the power supply unit 110 of the display device 100 may supply power to a display panel (e.g., the display panel 120 of FIG. 2) through the rectifier 111, the power factor corrector 113, and the power transformer 115.

According to an embodiment, the rectifier 111 may change the AC power supplied from the external power supply 10 to DC power. According to an embodiment, the rectifier 111 may include a bridge circuit (e.g., a bridge diode circuit) that rectifies the AC power to converts the AC power into the DC power. According to an embodiment, the rectifier 111 may output the rectified power to the power factor corrector 113.

According to an embodiment, the power factor corrector 113 may include a converter 113*a* for correcting; the power factor of the input power and a first controller 113*b* for controlling the converter 113*a*.

According to an embodiment., the converter 113*a* may correct the power factor of the power input through the rectifier 111. According to an embodiment, the converter 113*a* may include an inductor L connected in series to an input terminal, a first capacitor C1 connected in parallel to the input terminal, a first diode D1 connected between the inductor and the first capacitor C1, and a first switch SW1 connected in parallel to the first capacitor C1. For example, the first capacitor C1 may be a capacitor of low capacity (e.g., 10 to 20 μm). The first capacitor C1 may be a capacitor formed by stacking thin films. The capacitor of a low capacity may cause a sudden voltage drop of the output voltage depending on the connected load. According to an embodiment, the converter 113*a* may correct the power factor of the power input depending, on the on/off time of the first switch SW1. According to an embodiment, the converter 113*a* may output a first voltage V1 to the power transformer 115 by the power, of which the power factor is corrected.

According to an embodiment, the first controller 113*b* may correct the power factor of the power input to the power factor corrector 113, based on the first voltage V1 of the converter 113*a*. For example, the controller 113*b* may distribute the first voltage V1 by connecting a first resistor R1 and a second resistor R2 in series to the output terminal of the converter 113*a*. The controller 113*b* may correct the power factor of the input power, based on a second voltage V2 distributed to the second resistor R2. The first controller 113*b* may receive the second voltage V2 as an input through a second capacitor C2 and a third capacitor C3, which are connected in parallel to the second resistor R2, in other words, the first controller 113*b* may receive the second voltage V2 as an input signal. According, to an embodiment, the first controller 113*b* may generate an output signal for correcting the power factor of the input power. For example, the output signal may refer to a signal for outputting a third voltage V3 at a specified ratio (or a duty ratio) during a specified period. According to an embodiment, the first controller 113*b* may correct the power factor of the input power by turning on/off the first switch SW1 of the converter 113*a*, using the output signal.

According to an embodiment, when the first voltage V1 applied to the is power transformer 115 through the converter 113*a* of the converter 113*a* is less than the specified voltage, the first controller 113*b* may increase the first voltage V1 output through the converter 113*a*. For example, the specified voltage may be a minimum value at which the display panel 120 is capable of displaying an image without lost information. According to an embodiment, the first controller 113*b* may output a signal (or a first signal) for controlling the converter 113*a*, based on the first voltage V1. According to an embodiment, the first controller 113*b* may change the first signal. For example, when the first voltage is less than a specified voltage, the first controller 113*b* may increase the duty ratio of the first signal. According to an embodiment, the first controller 113*b* may change the output voltage r the first voltage V1) of the converter 113*a*, by controlling the on/off time of the first switch SW1 of the converter 113*a* using the first signal.

According to an embodiment, the power transformer 115 may convert the power, of which the power factor is corrected by the power factor corrector 113. According to an embodiment, the power transformer 115 may output a fourth voltage V4 applied to a display driver (e.g., the display driver of FIG. 117)), through the primary side coil connected to the fourth capacitor C4 and the secondary side coil connected to the second diode D2 and the third diode D3. For example, the fourth voltage V4 may be output through a fifth capacitor C5. According to an embodiment, the power transformer 115 may output a fifth voltage V5 applied to the main controller (e.g., the controller 130 of FIG. 2) through the secondary side coil to which the fourth diode D4 and the fifth diode D5 are connected. The fifth voltage V5 applied to the main controller may be output through a sixth capacitor.

According to an embodiment, the power transformer 115 may further include a second switch SW2, a third switch SW3, and a second controller 115a. According to an embodiment, the second controller 115a may control the on/off state of the power transformer 115 by turning on/off the second switch SW2 and the third switch SW3. According to an embodiment, the second controller 115a may control the on/off of the second switch SW2 and the third switch SW3 based on the specified output. For example, the second controller 115a may control the on/off of the second switch SW2 and the third switch SW3 based on the output applied to the main controller.

Accordingly, the power transformer 115 may supply power such that the display panel normally displays an image without a sudden drop in output voltage even though display panel operates as a high load.

Figure 4:
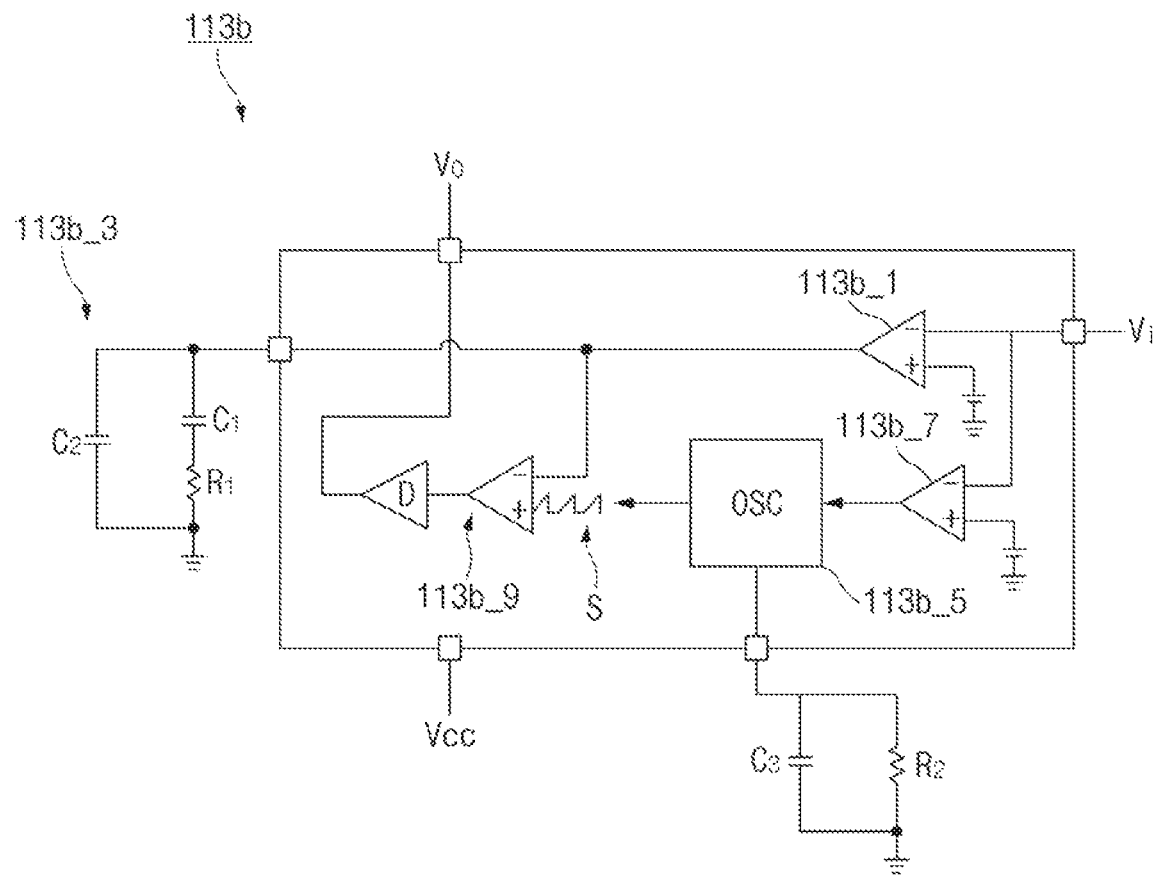
FIG. 4 is a block diagram illustrating a configuration of a first controller of a power factor correcting unit according to an embodiment.

FIG. 4 is a block diagram illustrating a configuration of a first controller of a power factor correcting unit according to an embodiment.

Referring to FIG. 4, the first controller 113b of the power factor correcting unit (e.g., the power factor correcting unit 113 of FIG. 3) may change the output voltage (e.g., the first voltage V1 of FIG. 3) of the converter (e.g., the converter 113a of FIG. 3) based on an input signal.

According to an embodiment, the first controller 113b may include an input signal amplifier 113b_1, an input signal compensation circuit 113b_3, an oscillator 113b_5, a signal controller 113b_7, and an output signal generator 113b_9.

According to an embodiment, the first controller 113b may receive the input signal. For example, the power factor correcting unit 113b may receive an input voltage Vi (e.g., the second voltage V2 of FIG. 3) based on the output voltage of the converter.

According to an embodiment, the input signal amplifier 113b_1 may amplify the input signal. According to an embodiment, the input signal compensation circuit 113b_3 may compensate for the input signal based on the specified voltage. For example, the input signal compensation circuit 113b_3 may be connected to the output terminal of the input signal amplifier 113b_1 to compensate for the input signal. According to an embodiment, the input signal compensation circuit 113b_3 may be composed of passive elements. For example, the input signal compensation circuit 113b_3 may include the first capacitor C1, the first resistor R1 connected in series to the first capacitor C1, and the second capacitor C2 connected in parallel to the first capacitor C1 and first resistor R1. Accordingly, it may be difficult to compensate for the input signal only with the input signal compensation circuit 113b_3 when the input voltage is suddenly dropped.

According to an embodiment, the oscillator 113b_5 may generate a control signal (or a first signal) 'S' for generating an output signal. For example, the oscillator 113b_5 may generate a first signal 'S' at a specified period with reference to a circuit to which the second resistor R2 and the third capacitor C3 are connected in parallel. For example, the first signal 'S' may be a signal in which a triangular wave increasing to a second voltage at a specified slope during a specified time is periodically generated.

According to an embodiment, the signal controller 113b_7 may control a signal (or the first signal 'S') generated by the oscillator 113b_5 based on the input signal. For example, the signal controller 113b_7 may change the first signal 'S' based on the input voltage Vi that is input. According to an embodiment, when the input voltage Vi is less than the specified voltage, the signal controller 113b_7 may change the first signal 'S'. For example, the signal controller 113b_7 may change at least one of the specified slope in the form of a triangular wave and a time (or a specified time) during which a voltage increases at a specified slope of the first signal 'S'. According to an embodiment, the signal controller 113b_7 may include an amplifier providing an input to the oscillator 113b_5. Accordingly, when the input voltage Vi is less than the specified voltage, the signal controller 113b_1 may rapidly compensate for the output signal, of which the voltage is dropped to be less than the specified voltage, by changing the first signal 'S'.

According to an embodiment, the output signal generator 113b_9 may generate an output signal (or the second signal) based on an input signal and a signal (or the first signal 'S') generated by the oscillator 113b_5. For example, the output signal generator 113b_9 may output the second signal based on the first signal 'S' and the amplified input signal. For example, the second signal may be a signal generating an output voltage (or the second voltage) Vo at a specified duty ratio during a specified period. According to an embodiment, the output signal generator 113b_9 may output the second signal through a driver (D) and an amplifier tor pulse width modulation (PWM). According to an embodiment, the output signal generator 113b_9 may output the second signal based on the amplified input signal and the first signal 'S' changed based on the input.

According to an embodiment, the first controller 113b may cause the converter to output a specified voltage, using the second signal. For example, the first controller 113b may output the changed voltage Vo based on the first signal 'S' changed based on the input voltage Vi. Accordingly, the first controller 113b may increase the output of the power factor correcting unit that is drastically lowered.

Figure 5:
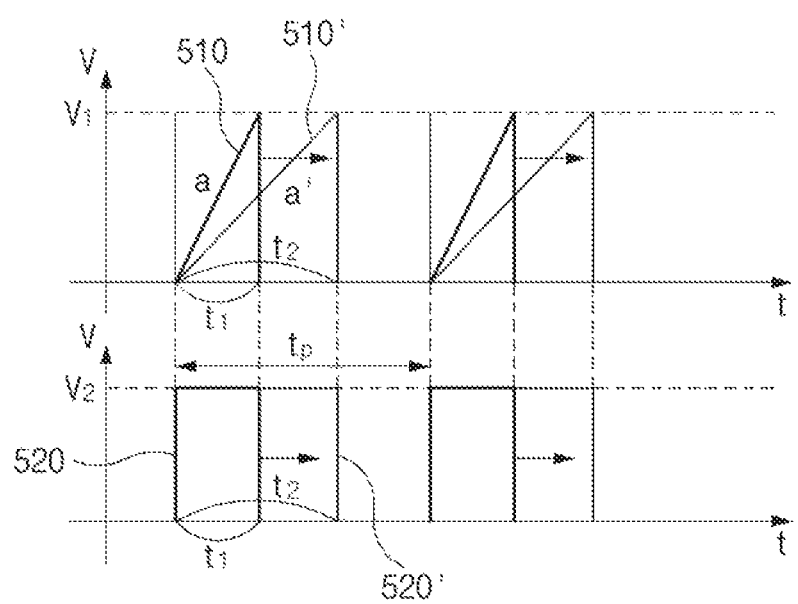
FIG. 5 is a graph illustrating a signal generated by a power factor corrector according to an embodiment.

FIG. 5 is a graph illustrating a signal generated by a power factor corrector according to an embodiment.

Referring to FIG. 5, when the input voltage is less than the specified voltage, the power factor corrector (e.g., the power factor corrector 113b of FIG. 3) may change the output voltage by changing the signal generated by an oscillator (e.g., the oscillator 113b_5 of FIG. 4).

According to an embodiment, the oscillator of the power factor corrector may generate a control signal 510 for generating an output signal. The control signal 510 may be a signal in which a triangular wave increasing to a first voltage V1 with a first slope "a" during a first time t1 is generated at a specified period tp According to an embodiment, the power factor corrector may generate an output signal 520 based on the input voltage and the control signal 510 of the oscillator. The output signal 520 may be a signal for generating a second voltage V2 at a first duty ratio 't1/tp' during a specified period tp. According to an embodiment, the specified time t1 of the control signal 510 may be similar to the duration time tp of the output signal 520.

According to an embodiment, when the input voltage is less than the specified voltage, the power factor corrector (e.g., the signal controller 113b_7 of FIG. 4) may change at least one of the first time t1 and the first slope 'a' of the control signal 310 generated by an oscillator. For example, the power factor corrector may change the first time t1 to a second time t2 by maintaining the reached first voltage V1 to change the first slope "a" to the second slope "a'". Accordingly, the power factor corrector may output the charged input signal 510' through the oscillator.

According to an embodiment, the power factor corrector may generate an output signal 520', of which the second duty ratio t2/tp is changed, by changing the signal generated by the oscillator.

Figure 6:
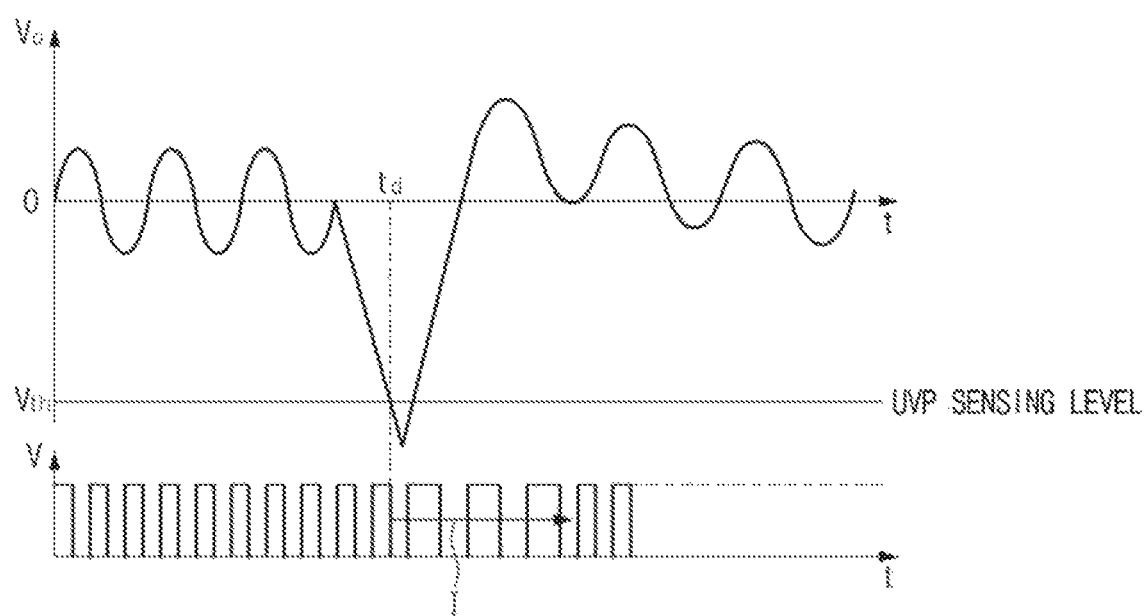
FIG. 6 is a graph illustrating an output voltage according to a voltage detected by a power factor corrector according to an embodiment.

FIG. 6 is a graph illustrating an output voltage according to a voltage detected by a power factor corrector according to an embodiment.

Referring to FIG. 6, when an output voltage Vo (e.g., the first voltage V1 of FIG. 3) is less than a specified voltage Vth, the power factor corrector (e.g., the power factor corrector 113b of FIG. 3) may increase the duty ratio of the output signal of a controller (e.g., the first controller 113b of FIG. 3) to increase the output voltage of a converter (e.g., the converter 113a of FIG. 3).

According to an embodiment, when detecting the specified voltage Vth at the specified time td, the power factor corrector may increase (I) the duty ratio of the output signal. Accordingly, the voltage output by the power factor corrector increases, and thus an image may be normally displayed on a display panel. According to an embodiment, when a normal output voltage is detected, the power factor corrector may reduce the duty ratio of the output signal again.

When the display panel operates as a high load, the output voltage output by the power supply unit may be dropped suddenly. At this time, the display device according to various embodiments described with reference to FIGS. 1 to 6 may detect the specified voltage to change a signal for controlling the power factor corrector, and thus may change the output voltage to a normal voltage with a fast reaction speed.

According to various embodiments at least part of a device (e.g., modules or functions thereof) or a method (e.g., operations) may be, for example, implemented by instructions stored in a computer-readable storage media in the form of a program module. The instruction, when executed by a processor, may cause the processor to perform a function corresponding to the instruction. The computer-readable recording medium may include a hard disk, a floppy disk, a magnetic media (e.g., a magnetic tape), an optical medium (e.g., a compact disc mid only memory (CD-ROM) and a digital versatile disc (DVD), a magneto-optical media (e.g., a floptical disk)), an embedded memory, or the like. The one or more instructions may contain a code made by a compiler or a code executable by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A display device comprising:
    a power factor corrector including a converter configured to correct a power factor of an input power and a controller configured to control the converter;
    a power transformer configured to convert power, of which a power factor is corrected by the power factor corrector; and
    a display panel configured to receive power through the power transformer to display an image,
    wherein the controller controls the converter to increase a first voltage when the first voltage output through the converter is less than a specified voltage,
    wherein the controller generates a first signal for controlling the converter, based on the first voltage,
    wherein the controller includes a signal controller including an amplifier configured to control an oscillator based on the first voltage, the oscillator generating a second signal, an input signal amplifier including an amplifier configured to amplify an input signal, and an output signal generator including an amplifier configured to output an output signal based on the second signal and the amplified input signal,
    wherein an input of the signal controller includes an input voltage, and an output of the signal controller corresponds to an input of the oscillator,
    based on the input of the oscillator, the oscillator generates the second signal which is included in an input of the output signal generator,
    based on the input of the output signal generator which includes the output of the input signal amplifier and the output of the oscillator, the output signal generator outputs the output signal.

2. The display device of claim 1, wherein the first signal is a signal for generating a second voltage during a specified period at a specified duty ratio, and
    wherein the controller increases a duty ratio of the second signal when the first voltage is less than a specified voltage.

3. The display device of claim 1, wherein the signal controller changes the second signal when the first voltage is less than a specified voltage.

4. The display device of claim 3, wherein the second signal is a signal in which a triangular wave increasing to a second voltage at a specified slope during a specified time is periodically generated, and
    wherein the signal controller changes at least one of the specified time and the specified slope of the second signal.

5. The display device of claim 4, wherein the signal controller reduces the specified slope to change the specified time for increasing to the second voltage.

6. The display device of claim 1, wherein the controller further includes a compensation circuit configured to compensate for an input voltage based on the first voltage, and
    wherein the compensation circuit is composed of passive elements.

7. The display device of claim 1, wherein a capacitor of a specified capacity or less is installed in an output terminal of the converter.

8. The display device of claim 1, wherein the specified voltage is a minimum value at which the display panel is capable of displaying an image without lost information.

* * * * *